United States Patent
Mese et al.

(10) Patent No.: US 12,388,836 B2
(45) Date of Patent: Aug. 12, 2025

(54) ULTRA-WIDEBAND-BASED DEVICE USE RESTRICTIONS

(71) Applicant: Lenovo (Singapore) Pte. Ltd., Singapore (SG)

(72) Inventors: John Carl Mese, Cary, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 294 days.

(21) Appl. No.: 17/204,844

(22) Filed: Mar. 17, 2021

(65) Prior Publication Data

US 2022/0303281 A1  Sep. 22, 2022

(51) Int. Cl.
  *H04L 29/06*  (2006.01)
  *G06F 21/62*  (2013.01)
  *H04L 9/40*  (2022.01)
  *H04W 4/021*  (2018.01)
  *H04B 1/38*  (2015.01)

(52) U.S. Cl.
  CPC ........ *H04L 63/107* (2013.01); *G06F 21/6209* (2013.01); *H04W 4/021* (2013.01); *G06F 2221/2111* (2013.01); *H04B 1/38* (2013.01)

(58) Field of Classification Search
  CPC ............... H04L 63/107; G06F 21/6209; G06F 2221/2111; H04W 4/021; H04B 1/38
  USPC .......................................................... 726/4
  See application file for complete search history.

(56) References Cited

U.S. PATENT DOCUMENTS

| | | |
|---|---|---|
| 9,257,133 B1 | 2/2016 | Strand |
| 10,841,174 B1 | 11/2020 | Ely et al. |
| 11,526,831 B1 * | 12/2022 | Rafii ...................... G06F 3/0487 |
| 2007/0109093 A1 | 5/2007 | Matsubara et al. |
| 2007/0264974 A1 * | 11/2007 | Frank .................... H04W 4/021 455/411 |
| 2008/0096560 A1 * | 4/2008 | Felske ................. H04W 36/144 455/436 |
| 2010/0048172 A1 | 2/2010 | Karaoguz |
| 2010/0246468 A1 * | 9/2010 | Santhanam ........... H04W 48/04 370/312 |
| 2011/0037712 A1 | 2/2011 | Kim et al. |
| 2011/0077022 A1 * | 3/2011 | Scovill .................. H04W 12/12 455/456.1 |
| 2012/0173137 A1 * | 7/2012 | Compton ............. G01C 21/206 701/423 |
| 2013/0179491 A1 * | 7/2013 | Bennett ............... H04L 65/1093 709/203 |

(Continued)

OTHER PUBLICATIONS

Wilken, "Places nearby: Facebook as a location-based social media platform", SAGE, 2014, pp. 1087-1103 (Year: 2014).*

(Continued)

*Primary Examiner* — Taghi T Arani
*Assistant Examiner* — Gregory A Lane
(74) *Attorney, Agent, or Firm* — John M. Rogitz; John L. Rogitz (57) ABSTRACT

In one aspect, an apparatus includes at least one processor and storage accessible to the at least one processor. The storage includes instructions executable by the at least one processor to use an ultra-wideband (UWB) transceiver to determine a current location of a device and to, based on the current location as determined using the UWB transceiver, restrict how the device can be used while the device is located at the current location.

20 Claims, 7 Drawing Sheets

(56) References Cited

U.S. PATENT DOCUMENTS

| | | | |
|---|---|---|---|
| 2014/0229426 A1* | 8/2014 | Gootee, III | G06F 30/13 707/608 |
| 2014/0253288 A1 | 9/2014 | O'Brien et al. | |
| 2015/0355708 A1 | 12/2015 | Lee et al. | |
| 2016/0302044 A1* | 10/2016 | Bottazzi | H04W 4/30 |
| 2018/0033244 A1 | 2/2018 | Northrup et al. | |
| 2018/0348844 A1 | 12/2018 | Lingutla et al. | |
| 2019/0051073 A1 | 2/2019 | Kuenzi | |
| 2019/0130175 A1 | 5/2019 | Nakashima et al. | |
| 2019/0228601 A1 | 7/2019 | Grzenda et al. | |
| 2019/0242720 A1* | 8/2019 | Shapiro | G01C 21/3492 |
| 2019/0258785 A1* | 8/2019 | Alameh | G06F 21/50 |
| 2020/0084314 A1* | 3/2020 | Mahar | H04W 4/40 |
| 2020/0228943 A1 | 7/2020 | Martin et al. | |
| 2020/0314651 A1 | 10/2020 | Pirch et al. | |
| 2020/0327753 A1 | 10/2020 | Leiterer et al. | |
| 2020/0334931 A1* | 10/2020 | Ashok | G07C 9/00182 |
| 2021/0082221 A1 | 3/2021 | Zhang et al. | |
| 2021/0117521 A1 | 4/2021 | Gorsica et al. | |
| 2021/0158637 A1 | 5/2021 | Kincaid et al. | |
| 2021/0185485 A1 | 6/2021 | Deixler et al. | |
| 2021/0271909 A1* | 9/2021 | Spell | H04W 48/04 |
| 2021/0306799 A1 | 9/2021 | Kim et al. | |
| 2021/0329534 A1* | 10/2021 | Szrom | H04W 48/04 |
| 2021/0409896 A1 | 12/2021 | Ahn et al. | |
| 2022/0026920 A1 | 1/2022 | Afrouzi et al. | |

OTHER PUBLICATIONS

Alarifi, "Ultra Wideband Indoor Positioning Technologies: Analysis and Recent Advances", 2016, Sensors, pp. 1-36 (Year: 2016).*

Jakes et al., "Ultra-Wideband to Identify and Control Other Device", related U.S. Appl. No. 17/204,900, Applicant's response to Non-Final Office Action filed May 31, 2022.

Jakes et al., "Unlocking Lock on Device Based on Ultra-Wideband Location Tracking", related U.S. Appl. No. 17/204,617, Final Office Action dated Jan. 25, 2022.

Jakes et al., "Unlocking Lock on Device Based on Ultra-Wideband Location Tracking", related U.S. Appl. No. 17/204,617, Non-Final Office Action dated Sep. 7, 2021.

Jakes et al., "Unlocking Lock on Device Based on Ultra-Wideband Location Tracking", related U.S. Appl. No. 17/204,617, Applicant's response to Non-Final Office Action filed Nov. 22, 2021.

Jakes et al., "Unlocking Lock on Device Based on Ultra-Wideband Location Tracking", related U.S. Appl. No. 17/204,617, Applicant's response to Final Office Action filed Mar. 3, 2022.

"FiRa Consortium", Wikipedia, retrieved from https://en.wikipedia.org/wiki/FiRa_Consortium on Feb. 16, 2021.

"Smart Home and Consumer", Fira: The Power to be Precise. Retrieved from https://www.firaconsortium.org/discover/use-cases/smart-home-consumer on Feb. 26, 2021.

"Speech to Text: A Speech service feature that accurately transcribes spoken audio to text", Microsoft Azure, retrieved from https://azure.microsoft.com/en-us/services/cognitive-services/speech-to-text/ on Feb. 26, 2021.

"Ultra-Wideband Technology", Infsoft, retrieved from https://www.ultrawideband.io/en/technology.php on Feb. 16, 2021.

"Ultra-wideband", Wikipedia, retrieved from https://en.wikipedia.org/wiki/Ultra-wideband on Feb. 16, 2021.

Wilhite, Tamara, "An Introduction to UWB Antennas", Turbo Future, Jan. 14, 2021, retrieved from https://turbofuture.com/misc/An-Introduction-to-UWB-Antennas.

Zwirello et al., "UWB Localization System for Indoor Applications: Concept, Realization and Analysis", Hindawi Publishing CorporationJournal of Electrical and Computer Engineering, vol. 2012, May 28, 2012. Retrieved from https://www.hindawi.com/journals/jece/2012/849638/.

Mese et al., "Unlocking and/or Awakening Device Based on Ultra-Wideband Location Tracking", related U.S. Appl. No. 17/204,543, Non-Final Office Action dated Dec. 9, 2021.

Mese et al., "Unlocking and/or Awakening Device Based on Ultra-Wideband Location Tracking", related U.S. Appl. No. 17/204,543, Applicant's response to Non-Final Office Action filed Jan. 6, 2022.

"Search Report and Written Opinion", dated Aug. 8, 2022, from the counterpart Great Britain application GB2200580.5.

"Building Digital Key Solution for Automotive", CarConnectivity consortium, retrieved from https://carconnectivity.org/wp-content/uploads/CCC-Digital-Key-White-Paper.pdf.

"Car Connectivity Consortium Unveils New Features for Digital Key Specification", Car Connectivity Consortium, Oct. 8, 2019, retrieved from https://carconnectivity.org/press-release/car-connectivity-consortium-unveils-new-features-for-digital-key-specification/.

"Digital Key", Car Connectivity Consortium, 2018, retrieved from https://carconnectivity.org/digital-key/.

"Smart Phone Digital Key", Car Connectivity Consortium, 2018, retrieved from https://carconnectivity.org/wp-content/uploads/CCC-Digital-Key-Brochure.pdf.

"Whitepaper—Digital Key—The Future of Vehicle Access", CarConnectivity Consortium, 2020, retrieved from https://carconnectivity.org/wp-content/uploads/2020/03/CCC_Digital_Key_2.0.pdf.

Jakes et al., "Ultra-Wideband to Identify and Control Other Device", file history of related U.S. Appl. No. 17/204,900, filed Mar. 17, 2021.

Jakes et al., "Unlocking Lock on Device Based on Ultra-Wideband Location Tracking", file history of related U.S. Appl. No. 17/204,617, filed Mar. 17, 2021.

Mese et al., "Ultra-Wideband Location Tracking to Perform Voice Input Operation", file history of related U.S. Appl. No. 17/205,265, filed Mar. 18, 2021.

Mese et al., "Unlocking and/or Awakening Device Based on Ultra-Wideband Location Tracking", file history of related U.S. Appl. No. 17/204,543, filed Mar. 17, 2021.

Jakes et al., "Ultra-Wideband to Identify and Control Other Device", related U.S. Appl. No. 17/204,900, Non-Final Office Action dated filed Mar. 11, 2022.

Jakes et al., "Unlocking Lock on Device Based on Ultra-Wideband Location Tracking", related U.S. Appl. No. 17/204,617, Non-Final Office Action dated Mar. 28, 2022.

Jakes et al., "Unlocking Lock on Device Based on Ultra-Wideband Location Tracking", related U.S. Appl. No. 17/204,617, Non-Final Office Action response filed Apr. 7, 2022.

Mese et al., "Ultra-Wideband Location Tracking to Perform Voice Input Operation", related U.S. Appl. No. 17/205,265, Final Office Action dated Feb. 22, 2023.

Mese et al., "Ultra-Wideband Location Tracking to Perform Voice Input Operation", related U.S. Appl. No. 17/205,265, Non-Final Office Action dated Dec. 21, 2022.

Mese et al., "Ultra-Wideband Location Tracking to Perform Voice Input Operation", related U.S. Appl. No. 17/205,265, Applicant's response to Final Office Action filed Mar. 9, 2023.

Mese et al., "Ultra-Wideband Location Tracking to Perform Voice Input Operation", related U.S. Appl. No. 17/205,265, Applicant's response to Non-Final Office Action filed Dec. 21, 2022.

* cited by examiner

SETTINGS

☐ ENABLE UWB TRACKING FOR ~602
  DEVICE RESTRICTIONS

☐ ASSUME LINEAR/SMOOTH BOUNDARIES ~604

RESTRICTIONS FOR [ JOHN'S TABLET ]:
                                  606

RESTRICT: ☐ GAMING ~608

☐ INTERNET ACCESS BESIDES FOR ~610
  VIDEO CONFERENCING

ONLY ALLOW ACCESS TO THE FOLLOWING WEBSITES:

[ ] ~612

ONLY ALLOW USE OF THE FOLLOWING APPS (SELECT):

[ VIDEO CONFERENCE ] ~614
[ WORD PROCESSOR ] ~616
[ FACE-PAGE ] ~618
[ TEXT MESSENGER ] ~620

TIME DURING WHICH RESTRICTIONS WILL BE
INSTITUTED: ☐ TO ☐ ON     [M-F] ~626
            622  624      [S,S] ~628
                          [ALL] ~630

DO NOT ALLOW UWB TO BE DEACTIVATED:

[ WITHIN RESTRICTION AREA/
  DURING RESTRICTION TIMES ] ~632

[ ANYTIME ] ~634

ULTRA-WIDEBAND-BASED DEVICE USE RESTRICTIONS

FIELD

The disclosure below relates to technically inventive, non-routine solutions that are necessarily rooted in computer technology and that produce concrete technical improvements. In particular, the disclosure below relates to techniques for ultra-wideband-based device use restrictions.

BACKGROUND

As recognized herein, most modern electronics devices are not equipped with features that allow sufficient fine-grain location tracking indoors. As such, and also recognized herein, it is often difficult or near impossible to accurately implement location-based network policies indoors. There are currently no adequate solutions to the foregoing computer-related, technological problem.

SUMMARY

Accordingly, in one aspect an apparatus includes at least one processor and storage accessible to the at least one processor. The storage includes instructions executable by the at least one processor to determine, based on at least one ultra-wideband (UWB) signal transmitted between a first device and a second device, a current location of one or more of the first device and the second device. The instructions are also executable to institute, based on the current location(s), one or more location-based use permissions for one or more of the first and second devices.

Thus, in some example implementations the apparatus may include a UWB transceiver accessible to the at least one processor, and the UWB transceiver may be used to send or receive the UWB signal.

In some example embodiments, the apparatus may be established by a server.

Also, in some example embodiments, the apparatus may include the first device and the instructions may be executable to determine a current location of the second device based on the UWB signal as transmitted by the second device and received by the first device. In these implementations, the instructions may then be executable to institute, for the second device, one or more location-based use permissions based on the current location of the second device as determined from the UWB signal. The first device may be established by one or more of a router, an access point, a UWB beacon, a smart home hub device, and/or a personal computer different from the second device.

Still further, in some example embodiments the apparatus may include the second device, and the instructions may be executable to institute, at the second device, one or more location-based use permissions for the second device based on the current location of the second device. The one or more location-based use permissions may relate to one or more particular functions that are allowed in a first room within a building but that are not allowed in a second room within the same building, where the current location of the second device may correspond to the second location.

Additionally, if desired a geographic area for the location-based use permissions may be established based on one or more of the first and second devices traversing a perimeter of a room of a building. Or a geographic area for the location-based use permissions may be established based on one or more of the first and second devices traversing an area larger or smaller than a room of a building associated with at least part of the area.

The one or more location-based use permissions themselves may restrict Internet access so that the Internet cannot be accessed for end-user tasks beyond video conferencing. In certain examples, the location-based use permission may also restrict Internet access to a subset of Internet sites that have been pre-approved, and/or restrict use of at least a first software application and allow use of at least a second software application different from the first software application.

In another aspect, a method includes using an ultra-wideband (UWB) transceiver on a first device to determine a current location of a second device and, based on the current location as determined using the UWB transceiver, applying one or more use restrictions for a second device while the second device is located at the current location.

The first device may be different from the second device or may be the same.

In certain example implementations, an area for the use restrictions may be established based on a digitized blueprint accessible to the first device.

Additionally, or alternatively, an area for the use restrictions may be established based on one or more of the first and second devices traversing a perimeter of a room of a building. If desired, in these examples the method may include presenting a graphical user interface (GUI) on a display that prompts an end-user to walk around the perimeter of a desired area to establish the area.

In still another aspect, at least one computer readable storage medium (CRSM) that is not a transitory signal includes instructions executable by at least one processor to use an ultra-wideband (UWB) transceiver to determine a current location of a device and, based on the current location as determined using the UWB transceiver, restrict how the device can be used while the device is located at the current location.

In certain examples, the one or more restrictions may restrict the device from being used for electronic gaming while the device is located in an area including the current location during a particular timespan on a weekday.

The details of present principles, both as to their structure and operation, can best be understood in reference to the accompanying drawings, in which like reference numerals refer to like parts, and in which:

DETAILED DESCRIPTION

Among other things, the detailed description below discusses using UWB communication for home and other network management. Thus, one or more restriction zones can be calibrated via a software agent that may help define a border of a room, multiple rooms, a floor of a house, etc. as the zone(s). Network traffic information may then be filtered based on the device's position inside the home as determined via UWB to restrict some activities identified as not part of a virtual school day or other activity with which the user is to be fully engaged. Network management tools may also be used to add a time component to further refine the restrictions by time of day. So, for example, a device may be enabled for schoolwork only in a certain room in a house on the second floor but restricted from gaming in the same room.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
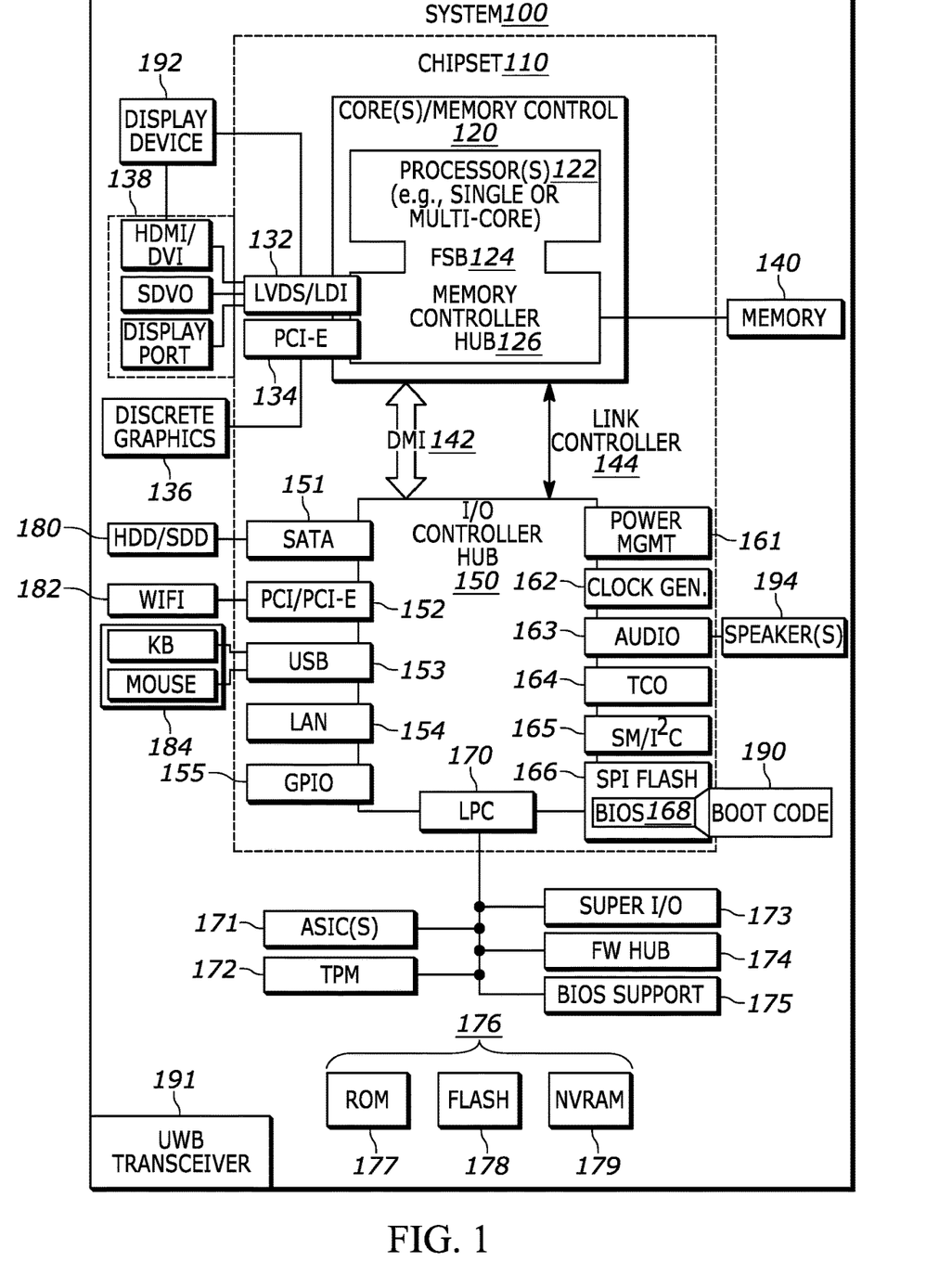
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc.

under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include an ultra-wideband (UWB) transceiver 191 configured to transmit and receive data using UWB signals and UWB communication protocol(s), such as protocols set forth by the FiRa Consortium. As understood herein, UWB may use low energy, short-range, high-bandwidth pulse communication over a relatively large portion of the radio spectrum. Thus, for example, an ultra-wideband signal/pulse may be established by a radio signal with fractional bandwidth greater than 20% and/or a bandwidth greater than 500 MHz. UWB communication may occur by using multiple frequencies (e.g., concurrently) in the frequency range from 3.1 to 10.6 GHz in certain examples.

To transmit UWB signals consistent with present principles, the transceiver 191 itself may include one or more Vivaldi antennas and/or a MIMO (multiple-input and multiple-output) distributed antenna system, for example. It is to be further understood that various UWB algorithms, time difference of arrival (TDoA) algorithms, and/or angle of arrival (AoA) algorithms may be used for the system 100 to determine the distance to and location of another UWB transceiver on another device that is in communication with the UWB transceiver 191 on the system 100.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
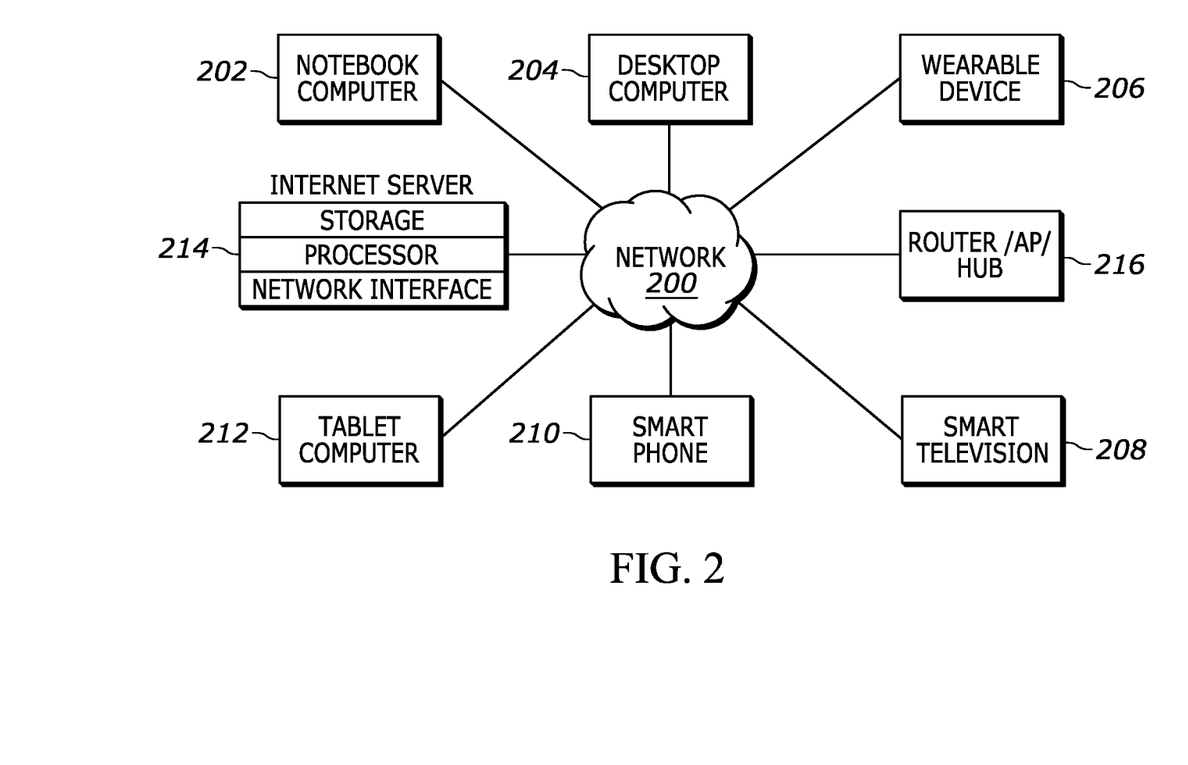
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a router or access point or beacon or smart home hub device 216, and a server 214 such as an Internet server that may provide cloud storage accessible to the devices 202-212, 216. It is to be understood that the devices 202-216 may be configured to communicate with each other over the network 200 and/or UWB to undertake present principles.

Figure 3:
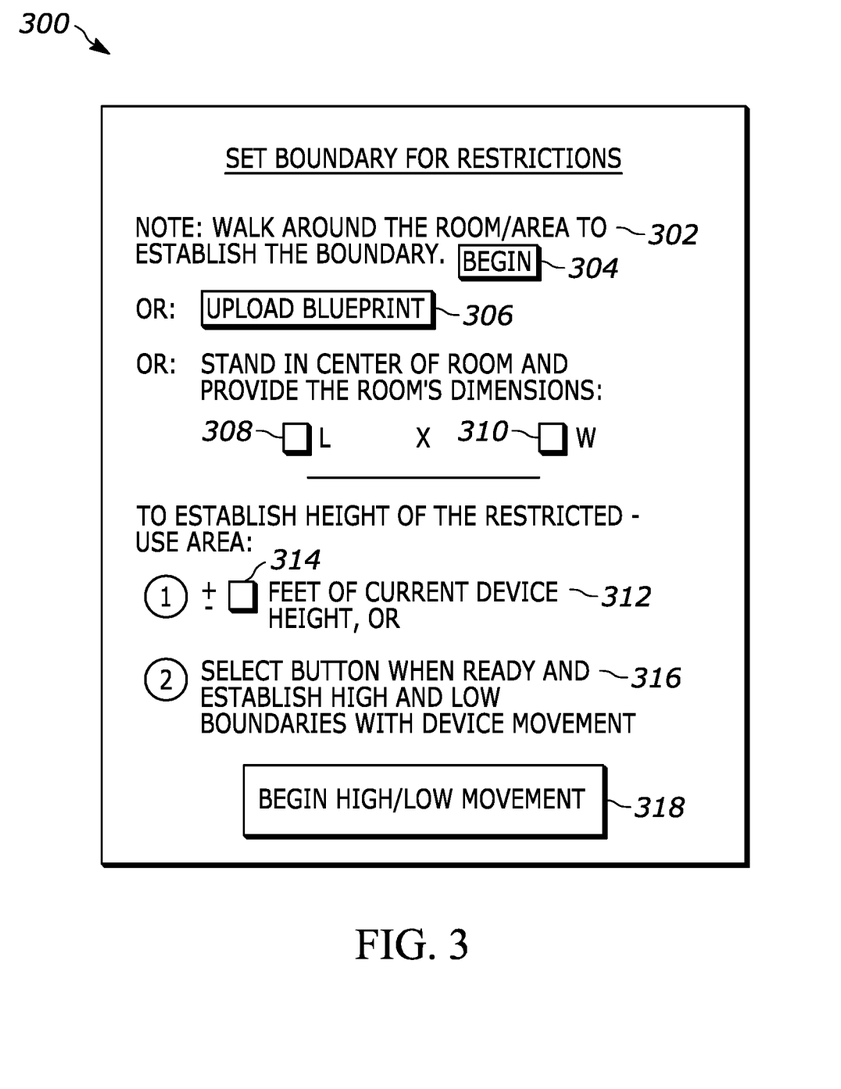
FIG. 3 shows an example graphical user interface (GUI) that may be presented on a display to help guide a user to establish an area within which device use permissions/restrictions are to be instituted consistent with present principles.

Now in reference to FIG. 3, suppose a system administrator, school official, or technology officer wished to define the geographic boundaries of an area within which use permissions/restrictions should be applied based on UWB location tracking. For example, a parent may wish to define the area as the bedroom of one of their children that participates in distance learning from the bedroom. Or a technology officer of a company, group, or organization may wish to define the area as a conference room of a building in which group meetings occur.

To do so, the end-user may launch a UWB tracking application ("app") or navigate a device menu to present the graphical user interface (GUI) 300 of FIG. 3 on the user's device. As shown, the GUI may include a prompt 302 indicating that the end-user should walk around the perimeter of the desired area to establish the area as one within which the use permissions/restrictions should be applied. The prompt 302 may be accompanied by a selector 304 that may be selectable to configure the end-user's device or the other device in communication therewith (used to perform the location tracking) to begin tracking the user's device via UWB to begin spatially mapping the boundaries of the area based on UWB signals exchanged between the two devices. As recognized by the present detailed description, since UWB signals allow not just proximity tracking but also relatively high-fidelity location tracking compared to other location-tracking methods, high-accuracy UWB location identifications can be achieved in indoor environments to accurately implement location-based device use permissions and restrictions.

However, further note that if the user wished to use another way to establish the boundaries of the area in order for UWB location tracking to be performed at a later time to institute use permissions/restrictions, the GUI 300 may afford other ways to do so as well. One example way would be for the user to upload a prestored digitized blueprint of the building or floor for which the restrictions are to be instituted. Thus, a selector 306 may be presented and may be selectable to launch a file browser from which the stored digital blueprint may be selected and uploaded.

As another example, the user may stand in the center of a room, the boundaries of which are to establish the boundaries for the restrictions. UWB location tracking may be performed to identify the current location of user's device while the user holds the device and stands in the middle of the room. The user may then enter length and width dimensions for the room via respective input boxes 308, 310. The device may then infer the boundaries of the room based on the assumption that it is currently in the center of the room and the length and width amounts the user has entered into the boxes 308, 310. Also note that where the length and width dimensions are not equal, additional input elements may be provided for the user to specify which leg or boundary of the area constitutes length and width dimensions.

Then, for the user to also establish the height of the area in which the device use permissions/restrictions are to be applied, different options may also be presented as part of the GUI 300. A first option 312 involves a user entering input to input box 314 to establish the height as plus and minus a predetermined number of feet relative to a current height/location of the device the user is holding.

A second option 316 involves the user selecting the selector 318 to initiate UWB location tracking of the user's device while the user moves their device to an upper limit of the desired area and a lower limited of the desired area. If the movement is inconsistent or oscillating as the user moves the device up and down, the highest and lowest points of the device during the UWB location tracking may be selected by the device as the upper and lower bounds of the area, respectively. So, per the room example above, the user may reach down and place their device on the floor to establish the lower boundary, then step on a stool and place their device against the ceiling to establish the upper boundary.

Figure 4:
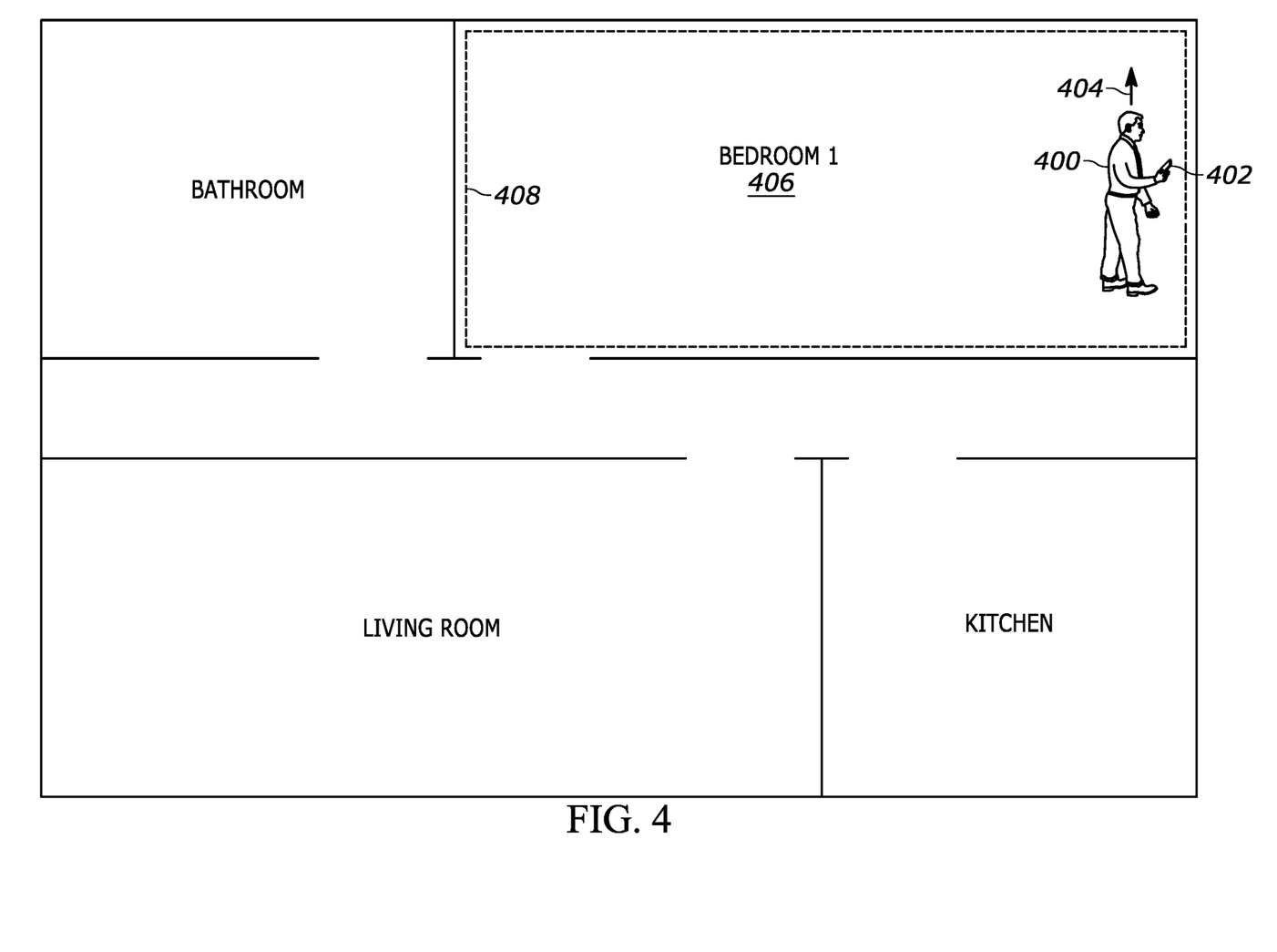
FIG. 4 shows an example schematic diagram of the user establishing the area consistent with present principles.

Also note before moving on to FIG. 4 that while UWB location tracking is being performed, another GUI may be overlaid on the GUI 300. The other GUI may include a "stop" selector that may be selected to stop UWB location tracking once the user is satisfied or length, width, and height inputs that have been provided.

The room example from above is further illustrated in the schematic diagram of FIG. 4, which shows the user (designated as 400) holding their device (designated as 402) and walking in a direction illustrated by arrow 404 around a room 406 that they wish to establish as the area in which device use restrictions are to be set. In this example, the schematic diagram shows a first floor of a multi-floor personal residence, and the track that the device 402 and user 404 traversed around the perimeter of the room 406 to establish the length and width boundaries is illustrated by the perforated lines 408 adjacent to the wall lines. Note that the user 400 may hold the device 402 relatively close to the respective walls of the room 406 as the user traverses the perimeter of the room 406 with the device 402 for UWB location tracking, such as within one inch or less so that the area established via the relatively high-fidelity UWB location tracking is close to if not the same as the actual area of the room 406 established by the room's walls themselves.

Figure 5:
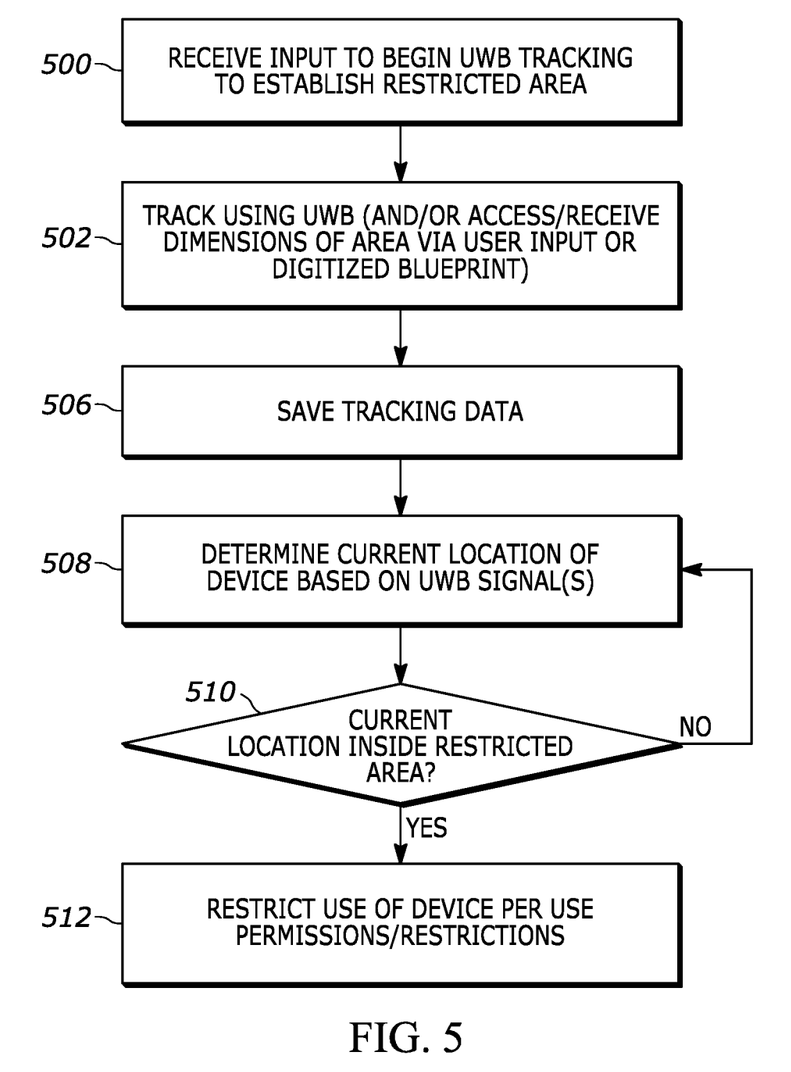
FIG. 5 illustrates example logic in example flow chart format that may be executed by a device to institute device use permissions/restrictions consistent with present principles.

Before moving on to the description of FIG. 5, note more generally that the area established by the user 400 within which device use restrictions are to be applied need not be limited to a single room or even any room. For instance, the area may be established based on the device 402 traversing an area larger or smaller than the room 406 but still within the same building. Or the area may be established while located in an open space such as a park or field. For example, if a group of students were sitting in an outdoor playground area or lunch area, the students' teacher may walk around the group with his/her UWB-enabled smartphone to establish a virtual perimeter within which device use permissions for each of the students' own devices may be applied.

Referring now to FIG. 5, it shows example logic that may be executed by a system such as the system 100 or, per the example above, the device 402 consistent with present principles. Note that while the logic of FIG. 5 is shown in flow chart format, state logic or other suitable logic may also be used.

Also note that various steps of the logic may be executed in whole or in part by one or more UWB-enabled devices that might be communicating with each other for UWB-based location tracking in any appropriate combination. For example, the logic may be executed in whole or in part by the device 402, and/or by another device within the same building as the room 406 such as an Internet modem/router, network access point, UWB beacon, another personal computer/personal device, a smart home hub device used for Internet of things (IoT) management, etc., each of which may have its own respective UWB transceiver to communicate with the UWB transceiver on the device 402 for UWB location tracking of the device 402. Additionally, or alternatively, a remotely-located Internet-based server may execute various steps in the logic in examples where it communicates with the other two UWB-enabled devices that themselves are at a common location (such as the building in which the room 406 is located) to receive the appropriate UWB data therefrom and to remotely control permissions/restrictions for a given device at the common location. The remotely-located server might be tens or hundreds of miles away, for example.

In any case, the logic may begin at block 500 where the system may receive input to begin UWB-based location tracking to define an area inside of which device restrictions/permissions are to be applied. For example, at block 500 the system may receive input of the user selecting the selector 304 or 318 of FIG. 3 or may receive a voice command or other suitable command to begin tracking.

From block 500 the logic may then proceed to block 502 where the system may track the location of the device being moved about the area to define the area using UWB signal transmission between that device and another UWB-enabled device. For example, the device being moved about to establish the area may broadcast UWB signals using its UWB transceiver for another UWB device near the area to identify and track the current location of the moving device. Additionally, or alternatively, the moving device may track its own location based on UWB signals received from the other device. Thus, the location tracking of the moving device may be relative to the other device, or if absolute location identification were desired then a known location of the other device may be used to infer the current absolute location of the moving device (e.g., if the other device were in a fixed or static place as might occur with an Internet router). Still further, again note that some or all of the location tracking may be performed by a remotely-located server based on UWB signal data being forwarded by each of the other two UWB-enabled devices.

The current location of the moving device may itself be determined using one or more UWB location identification algorithms, time difference of arrival (TDoA) algorithms, and/or angle of arrival (AoA) algorithms, for example. UWB location detection at block 502 may thus afford relatively high-fidelity location tracking of the moving device compared to other location-tracking methods and as recognized by the present detailed description, high-accuracy UWB location identifications are particularly helpful in indoor and intimate environments to accurately apply location-based device use permissions/restrictions.

Still in reference to block 502, also note that at block 502 the system executing the logic may also access or receive the dimensions of the area with which the use restrictions/permissions are to be instituted based on user input (e.g., to the boxes 308, 310, and 314 of FIG. 3) and/or a digitized blueprint that might be located on the Internet or provided by a user (e.g., using the selector 306 of FIG. 3). Additionally, or alternatively, input from a camera on the moving device may be processed using computer vision to determine the dimensions of the area.

From block 502, the logic may then proceed to block 504 where the system may save the tracking data indicating the area in local persistent storage and/or in remote persistent storage, such as a hard disk drive or solid-state drive.

Then, at a later time after the area has been established, the logic may proceed to block 506. At block 506, the system may determine a current location of a first UWB-enabled device using UWB signals transmitted between it and a second UWB-enabled device to determine whether the first UWB-enabled device is within the area for which device use permissions/restrictions are to be applied. The first UWB-enabled device may be the same device that moved about the area to establish the area in the first place at block 502 or may be a different UWB-enabled device that has nonetheless been configured to have one or more use permissions instituted while within the area.

From block 506 the logic may then proceed to decision diamond 508 where the system may determine whether the first UWB-enabled device's current location is inside the area. A negative determination may cause the logic to move back to block 506 to continue tracking the current location of the first UWB-enabled device. However, an affirmative determination may instead cause the logic to proceed to block 510 where the system may restrict use of the first UWB-enabled device according to use permissions and/or restrictions set for the first UWB-enabled device. If block 510 is executed by a device other than the first UWB-enabled device (e.g., a server, local router within the same building, etc.), then the other device may control a network gateway or router, and/or the first UWB-enabled device itself, to apply the permissions and restrictions. If block 510 is executed by the first UWB-enabled device, it may control its own functions according to the permissions and restrictions while within the area. In either case, in some examples an app may be executing at the first UWB-enabled device to apply the permissions and restrictions without allowing a user of the first UWB-enabled device to change the permission and restrictions without appropriate authentication credentials.

Figure 6:
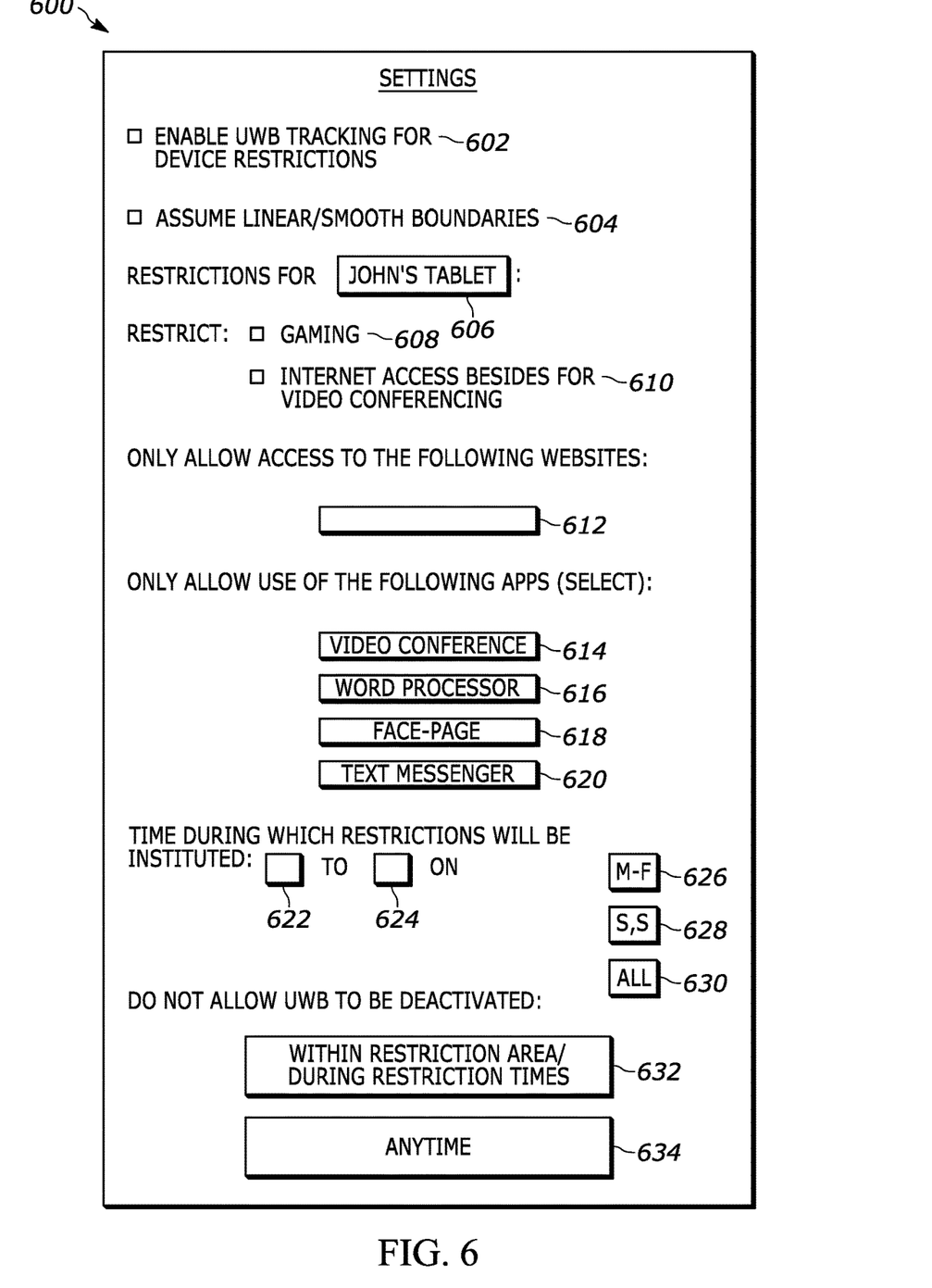
FIG. 6 shows an example settings GUI that may be presented on a display to configure one or more settings of a device/location tracking system to operate consistent with present principles.

Now in reference to FIG. 6, it shows an example GUI 600 that may be presented on the display of an end-user's device or a system administrator's device to either permit or restrict use of certain functions of a given device while in the established area within which the permissions/restrictions are to be instituted. Thus, the GUI 600 may be presented for configuring one or more settings of the device to operate consistent with present principles, and it is to be understood that each option to be discussed below may be selected by directing touch or cursor input to the respectively adjacent check box.

Beginning first with the option 602, it may be selected to set or enable the system to undertake present principles in the future. For example, the option 602 may be selected to set or configure the system to enable UWB-based location tracking of a device to determine whether to institute use permissions/restrictions at that device. E.g., selection of the option 602 may set or enable the system to execute the logic of FIG. 5 as well as to perform other functions of the device 402 discussed above in relation to FIGS. 3 and 4.

Additionally, in some examples the GUI 600 may include an option 604 to set or enable the location-tracking system to assume linear boundaries and/or defined geometric shapes (e.g., principal geometric plane shapes such as the rectangle, circle, or triangle) for an area/room in which device use permissions/restrictions are to be instituted. Thus, selecting option 604 may be helpful if larger objects such as a large desk or bookcase gets in the way while the user traverses the perimeter of a room/desired area to set the boundaries of the area and thus prevents the user from keeping his/her device close to the room's wall (or other area perimeter) at certain points while walking around the room/area for which use restrictions/permissions are to be instituted. In such an instance, if UWB signals indicate an inlet (e.g., of less than a threshold length such as five feet) with a co-linear/co-planar segment on each side of the inlet, the inlet may be ignored and the boundary for that side/wall of the room or other area may instead be assumed to extend co-linearly between and with the co-linear/co-planar segments on either side of the inlet itself. Similarly, if the room's wall is curved, a same radius as the segments to the left and right of the inlet may be assumed for the entirety of that boundary notwithstanding the inlet.

Still in reference to FIG. 6, the GUI 600 may also include a drop-down selector 606 which may be selected to cause a drop-down menu to be overlaid on the GUI 600 from which the user may select a given networked device for which to configure use permissions and restrictions. In the present example, a device named "John's tablet" has been selected, as shown on the face of the selector 606.

As for the permissions/restrictions themselves, a list of one or more restricted function options may be presented. In the present example, a gaming option 608 may be selected to restrict (in this case, prevent completely) John's tablet from being used for electronic gaming while the tablet is located in an established area for which use permissions/restrictions are to be instituted. Thus, regardless of whether a gaming application is executed locally at the tablet or gaming is participated in online using the tablet, the gaming may be restricted. An electronic list of gaming apps, game names, and/or gaming websites may be used to identify gaming that should be restricted in a given instance, for example.

As another example, an option 610 may be presented to restrict Internet access for end-user-requested tasks for John's tablet in the established area, save for video conferencing (e.g., as part of distance learning or a business video conference).

If desired, the user or administrator may also use the input box 612 to pre-approve a subset of various domain names/websites for which access at the tablet may be permitted while in the established area so that access to any domain name/website not on the list is denied while the tablet is in the established area.

Still further, in some examples only certain apps may be permitted for use at the tablet while within the established area. Use of all other apps may therefore be denied while the tablet is within the established area. To select apps that are permitted for use, selectors for one or more available apps may be selected to permit their use. In the present example, the selectors relate to use of a particular video conference application (selector 614), a particular word processing application (selector 616), a particular social media/networking application (selector 618), and a particular text messaging application (selector 620).

Additionally, in some examples device use permissions/restrictions for an established area may be implemented only during certain timespans rather than for all times. Thus, input boxes 622, 624 may be presented to establish respective beginning and ending times of day during which the permissions/restrictions for John's tablet should be instituted. If desired, one of the selectors 626-630 may be selected to specify that the times of day input into the boxes 622, 624 are for weekdays (selector 626), Saturday and Sunday only (selector 628), or all days of the week (selector 630).

Still further, in some examples the GUI 600 may include selectors 632, 634. Selector 632 may be selected to set or configure John's tablet to disallow its UWB transceiver (or UWB communication) from being disabled or deactivated while John's tablet is within the established area (possibly only during times set using the elements 622-630) so that the use permissions and restrictions cannot be circumvented by simply turning off UWB communication or the transceiver itself. Or if disallowing the UWB transceiver or UWB communication on John's tablet from being disabled or deactivated is to be instituted for all locations and times regardless of whether John's tablet is within the established area or another area for which no permissions/restrictions exist, selector 634 may be selected so that UWB communication cannot be turned off while outside an established area to circumvent the restrictions/permissions before entering an established area associated with use permissions/restrictions.

Figure 7:
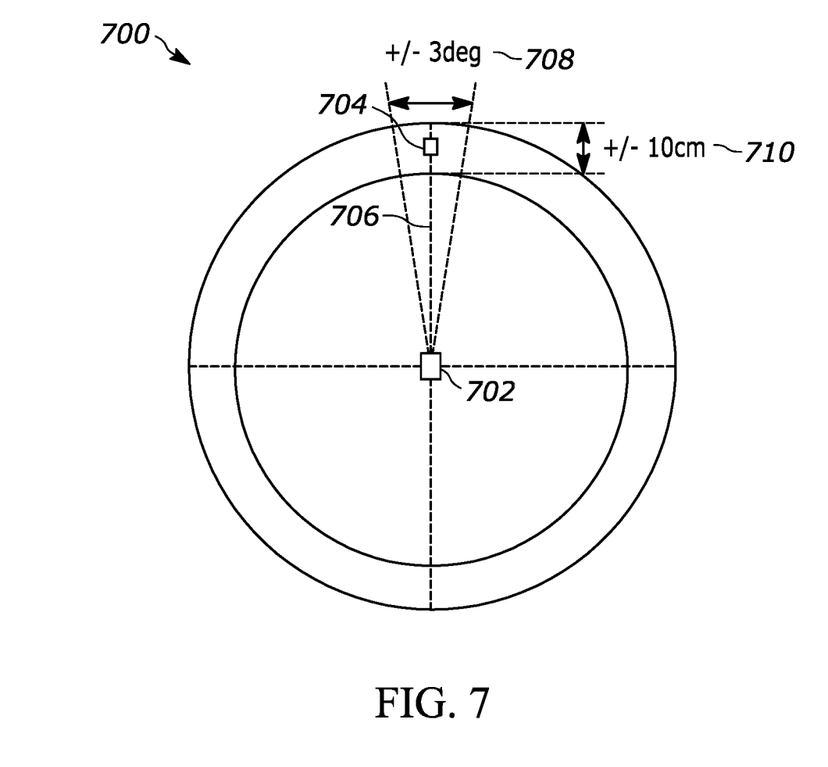
FIG. 7 shows an example illustration of UWB location accuracy consistent with present principles.

Now in reference to FIG. 7, it shows an example illustration 700 of UWB location accuracy. As shown, a first device 702 that might be executing the logic of FIG. 5 may determine a bearing 706 to a second device 704 using UWB signal exchange, which may be accurate to plus/minus three degrees 708 or even less. Depth (distance) between the first device 702 and second device 704 may also be determined using UWB to plus/minus ten centimeters 710 or even less. Thus, the device 702 may determine the location of the device 704 relative to the device 702 with relatively high accuracy. So, for example, the device 702 may be a router or gateway instituting use permissions/restrictions for the device 704 by tracking the location of the device 704 via UWB.

It may now be appreciated that present principles provide for an improved computer-based user interface that increases the functionality and accuracy of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. An apparatus, comprising:
   at least one processor; and
   storage accessible to the at least one processor and comprising instructions executable by the at least one processor to:
   determine, based on at least one ultra-wideband (UWB) signal transmitted between a first device and a second device, a current location of one or more of the first device and the second device;
   filter network traffic to institute, based on the current location(s), one or more location-based use permissions for one or more of the first and second devices, the one or more location-based use permissions being subject to a time of day restriction such that the one or more location-based use permissions are implemented during at a first timespan of a first day but are not implemented during a second timespan of the first day, the second timespan being different from the first timespan, the one or more location-based use permissions allowing video conferencing but not other user access to the Internet for end-user-requested tasks; and
   present a graphical user interface (GUI) on a display, the GUI comprising a selector that is selectable to set the apparatus to disallow turning off of UWB communication to otherwise circumvent institution of the one or more location-based use permissions based on UWB location tracking.

2. The apparatus of claim 1, comprising a UWB transceiver accessible to the at least one processor, the UWB transceiver being used to send or receive the UWB signal.

3. The apparatus of claim 1, wherein the apparatus comprises the first device, and wherein the instructions are executable to:
   determine a current location of the second device based on the UWB signal as transmitted by the second device and received by the first device; and
   institute, for the second device, one or more location-based use permissions based on the current location of the second device as determined from the UWB signal.

4. The apparatus of claim 1, wherein the apparatus comprises the second device, and wherein the instructions are executable to:
   institute, at the second device, one or more location-based use permissions for the second device based on the current location of the second device.

5. The apparatus of claim 4, wherein the one or more location-based use permissions relate to one or more particular functions that are allowed in a first room within a building but that are not allowed in a second room within the same building, and wherein the current location of the second device corresponds to the second location.

6. The apparatus of claim 1, wherein the instructions are executable to:
   disallow the turning off of UWB communication by disallowing a UWB transceiver from being disabled or deactivated.

7. The apparatus of claim 1, wherein the instructions are executable to:
   while within an area for which the location-based use permissions do not apply, disallow the turning off of UWB communication to otherwise circumvent institution of the one or more location-based use permissions based on UWB location tracking.

8. The apparatus of claim 1, wherein the one or more location-based use permissions are instituted for the first device.

9. The apparatus of claim 8, wherein the instructions are executable to:
   disallow the turning off of UWB communication at the first device to otherwise circumvent institution of the one or more location-based use permissions for the first device based on UWB location tracking.

10. The apparatus of claim 1, wherein the instructions are executable to:
    disallow turning off of UWB communication to otherwise circumvent institution of the one or more location-based use permissions based on UWB location tracking.

11. A method, comprising:
    using an ultra-wideband (UWB) transceiver on a router to determine a current location of a second device different from the router;
    based on the current location as determined using the UWB transceiver, filtering network traffic information at the router to apply one or more use restrictions for the second device while the second device is located at the current location; and
    presenting a graphical user interface (GUI) on a display, the GUI comprising a selector that is selectable to set the second device to disallow turning off of UWB communication at the second device to otherwise circumvent application of the use restrictions for the second device.

12. The method of claim 11, wherein the one or more use restrictions are subject to a time of day restriction as managed by one or more network management tools executing at the router such that the one or more use restrictions are implemented during at a first timespan of a first day but are not implemented during a second timespan of the first day, the second timespan being different from the first timespan.

13. The method of claim 11, wherein the one or more use restrictions allow video conferencing but not other user access to the Internet for end-user-requested tasks.

14. An apparatus, comprising:
    at least one computer readable storage medium (CRSM) that is not a transitory signal, the computer readable storage medium comprising instructions executable by at least one processor to:
    use an ultra-wideband (UWB) transceiver to determine a current location of a device different from a router;
    based on the current location as determined using the UWB transceiver, filter network traffic information at the router to restrict how the device can be used while the device is located at the current location; and present a graphical user interface (GUI) on a display, the GUI comprising a selector that is selectable to set the device to disallow turning off of UWB communication at the device to otherwise circumvent application of the restriction of how the device can be used while the device is located at the current location.

15. The apparatus CRSM of claim 14, wherein the one or more restrictions restrict the device from being used for electronic gaming while the device is located in an area comprising the current location during a particular timespan on a weekday.

16. The apparatus CRSM of claim 14, wherein the instructions are executable to:
use one or more network management tools executing at the router to filter the network traffic information during a first time of day but not during a second time of day, the first and second times of day pertaining to a same day.

17. The apparatus CRSM of claim 14, wherein the instructions are executable to:
use the router to control a network gateway to restrict how the device can be used while the device is located at the current location.

18. The apparatus CRSM of claim 14, wherein restricting how the device can be used while the device is located at the current location comprises allowing video conferencing but not other user access to the Internet for end-user-requested tasks.

19. The apparatus of claim 14, comprising the UWB transceiver.

20. The apparatus of claim 19, comprising the router.

* * * * *